July 14, 1970 W. G. FRUEHAUF 3,520,542
DOUBLE WEDGE SEAL
Filed Feb. 16, 1966

INVENTOR.
WALDO GERHARD FRUEHAUF
BY Stephen M. Mihaly
ATTORNEY

United States Patent Office 3,520,542
Patented July 14, 1970

3,520,542
DOUBLE WEDGE SEAL
Waldo Gerhard Fruehauf, Kalamazoo, Mich., assignor to Pneumo Dynamics Corporation, Cleveland, Ohio, a corporation of Delaware
Filed Feb. 16, 1966, Ser. No. 527,971
Int. Cl. F16j *15/32*
U.S. Cl. 277—118                                   5 Claims

ABSTRACT OF THE DISCLOSURE

A seal ring of U-shape cross section with wedge rings angularly bearing against the resulting inner and outer sealing lips for wedging them apart. The rings are loaded axially to provide such wedging by a plurality of balls and a spring backing the same.

---

This invention relates to a double wedge action seal assembly for piston rods and the like.

It is a principal object of the invention to provide such an assembly in which an elastomeric sealing member of special configuration is employed and subjected, at different sections, to deformation by wedging forces acting generally in opposite directions, with the thus produced deformation providing at least a significant part of a generally transverse expansion of the member to effect or assist sealing of surfaces between which it is interposed.

Another important object is to provide such a seal assembly in which the two wedging actions are independently applied to the respective sections of the sealing member to the extent that the assembly can inherently compensate for unequal wear or other comparable variations between the sections, with piston rod sealing being an application of the invention in which one such section is dynamic and the wedging thereof will adjust to compensate for wear of this section independently of the wedging action at the other stationary section of the member.

It is also an object of the invention to provide such a double wedge seal in which a simple loading device is utilized for both wedging actions while permitting the aforesaid independent relation in the application of the force by these actions to the sealing member.

A further object is to provide a double wedge seal assembly with a loading device as indicated which is, moreover, adaptable to ready and inexpensive adjustment to determine variably the available force to suit different use requirements.

An additional object is to provide a double wedge seal having side load carrying ability, whereby the seal can additionally function in the manner of a sleeve bearing for example in association with a piston rod.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
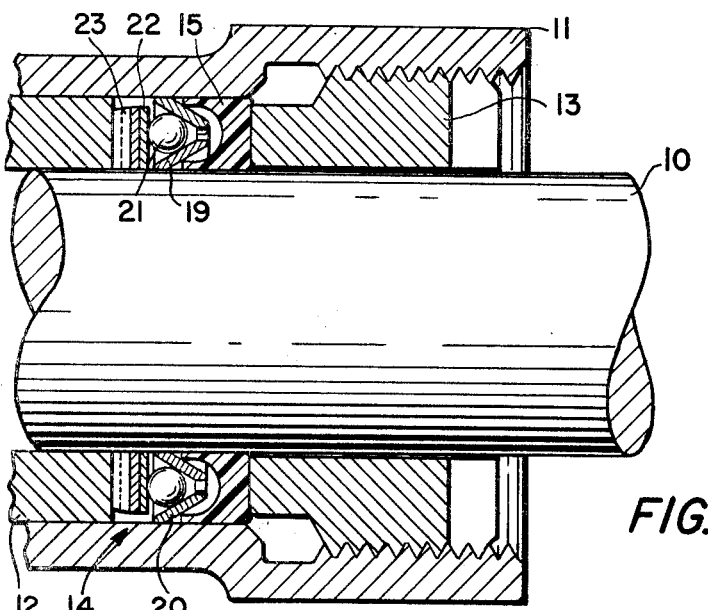
FIG. 1 is a fragmentary longitudinal section of a piston rod assembly in which a seal in accordance with the present invention is incorporated.

Referring now to the drawing in detail, reference numeral 10 designates a portion of a piston rod or similar element in association with a housing 11 which could, for example, be the end cap of a cylinder with respect to which the piston rod is reciprocated. Within this housing or end cap 11, the piston rod extends through a bushing 12 and a gland 13, the latter being threaded into the end of the cap.

The new seal is designated generally by reference numeral 14 and is interposed between the bushing 12 and the gland 13. This seal comprises a continuous ring 15 made of a suitable elastomeric material, with the choice of the particular material used selected as usual with regard to the expected operating conditions, such as temperature, to which it will be subjected in a particular working assembly. Ring 15 is formed with the illustrated radial cross-section so that it is generally square with a continuous groove 16 in one end face. In the embodiments shown, the groove has a depth which is approximately half of the axial extent or thickness of the ring, the bottom being semi-cylindrical, and a width which is approximately two-thirds of the radial extent or width of the ring. The groove is moreover centered in the end face, and the formation provides inner and outer sealing lips respectively designated 17 and 18 of materially reduced width and correspondingly generally tapered outwardly.

The seal ring 15 is disposed as shown with the groove and the two sealing lips innermost, the gland 13 abutting the opposite outer end to retain the seal. An inner wedge ring 19 of frusto-conical shape is disposed against the inner sealing lip 17 with its larger end accommodated in the groove 16 and its smaller end spaced axially inwardly, so that this wedge ring extends angularly across such lip interiorly of the latter. A comparable outer wedge ring 20 is correspondingly associated with the outer sealing lip 18, these two rings being independently formed and not interconnected in the assembly.

Steel balls 21 are disposed freely within the outwardly converging space between the two wedge rings 19 and 20, and a flat backing ring 22 serves to retain the balls cooperably with an undulating or wavy spring washer 23 in the first form of the assembly. The washer is against the end of the piston rod bushing 12, and it will be clear that the seal is preloaded by predetermined compression of the spring washer through advance of the seal retaining gland. A nest of such washers can, moreover, be employed and variably arranged for additional variation of the preload, and adjustment can also be had by the application of very inexpensive flat shim rings in the assembly of the spring 23 and ball backing ring 22.

Figure 4:
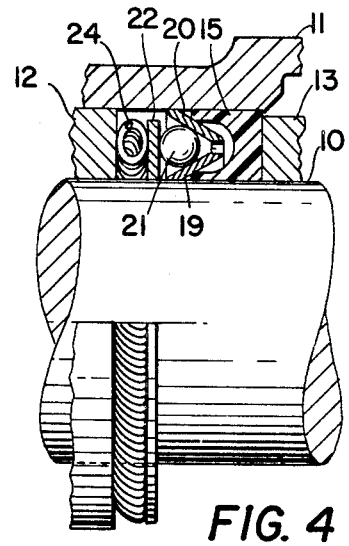
FIG. 4 illustrates also in fragmental longitudinal section a slightly modified form of the seal assembly.
Figure 2:
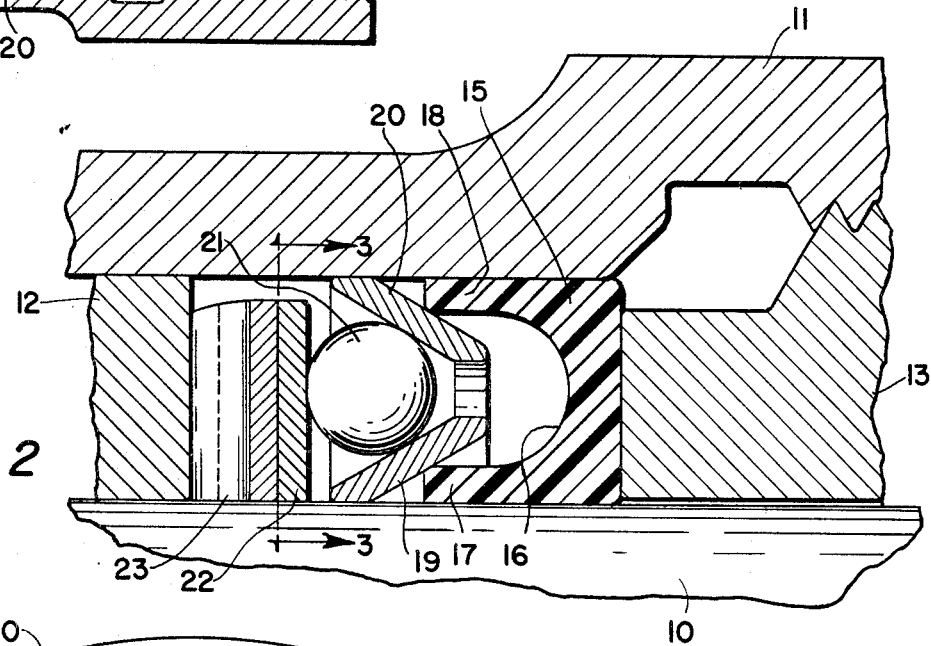
FIG. 2 is a comparable section but showing only a portion of the FIG. 1 assembly on an enlarged scale.
Figure 3:
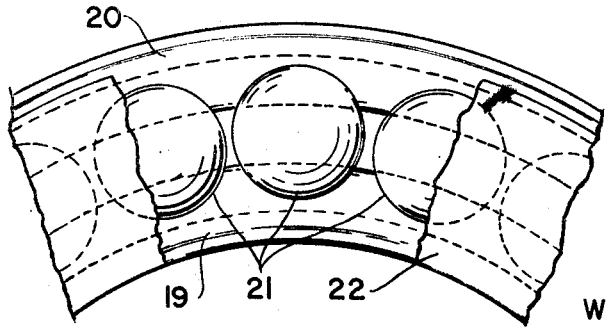
FIG. 3 is an elevation of a portion of the new seal as appearing for example in the plane indicated by the line 3—3 in FIG. 2 but removed from the full assembly.

In the modified seal form of FIG. 4, it will be seen that a close wound coil spring garter 24 is utilized in place of the wavy spring washer 22 in the first form for comparable preloading. The spring garter does act somewhat differently in resisting the axial compression applied through the gland in that the relative flattening of each turn produces increasing torsion therein accompanied by an increase in the separation of its points of engagement with the surfaces at the respective sides. This distance is the torque arm of the axial force developed and, since the torsion is the product of the force and arm and both the torsion and arm increase upon deflection, this type of spring can provide a desired force for preloading at a given deflection which will remain the same or substantially so even though the loading should cause further compression of the spring.

The force thus established acts through the balls commonly on the inner and outer wedge rings, with the latter wedging the inner and outer sealing lips as a result respectively inwardly and outwardly into sealing relation with the piston rod and the cylinder end cap. Since the wedge rings are free to move relatively, the inner ring can advance on the inner sealing lip to automatically compensate for wear thereon independently of the outer wedge ring; the illustrated separation of the balls permitting such relative advance without loss of backing or load on such inner ring.

It will also be seen that this seal assembly can carry side load and, accordingly, acts secondarily as an extension of the piston rod bushing. The design is sufficiently compact that the new seal can be used readily as a replacement for conventional seals, such as the common chevron asbestos type, in existing devices without alteration.

Other modes of applying the principle of the invention may be employed, change being made as regards the details described, provided the features stated in any of the following claims or the equivalent of such be employed.

I, therefore, particularly point out and distinctly claim as my invention:

1. A double wedge seal comprising a ring form resiliently deformable member having radially spaced-apart inner and outer sealing lips the respective outer surfaces of which are generally cylindrical and concentric for engagement with corresponding annular surfaces to be sealed, first and second wedges angularly overlying the ends of said lips and extending only partially into the space between the two lips for wedging the lips apart and thereby sealingly against such surfaces, and means for resiliently loading the first and second wedges in such wedging direction, the wedges being movable relative to each other into the space between the lips under such loading for independent compensating adjustment thereof to uneven wearing of the two lips as a result of relative movement of the sealed surfaces.

2. A double wedge seal as set forth in claim 1, wherein said wedges are unconnected and spaced apart inner and outer frustoconical wedge rings in angular engagement with the sealing lips.

3. A double wedge seal as set forth in claim 2, wherein the loading means includes a plurality of force-transmitting balls between the inner and outer wedge rings.

4. A double wedge seal as set forth in claim 3, wherein the loading means further comprises a substantially flat backing ring disposed against said balls, and a spring washer behind said backing ring for developing the loading force.

5. A double wedge seal as set forth in claim 3, wherein the loading means further comprises a substantially flat backing ring disposed against said balls, and a close wound coil spring garter behind said backing ring for developing the loading force.

References Cited

UNITED STATES PATENTS

| | | | |
|---|---|---|---|
| 2,326,489 | 8/1943 | Payne | 277—84 X |
| 1,901,606 | 3/1933 | Marsh | 277—117 X |
| 2,701,155 | 2/1955 | Estel | 277—152 |
| 2,819,917 | 1/1958 | Watson et al. | 277—117 |
| 3,264,885 | 8/1966 | Shellhause et al. | 277—152 X |
| 3,326,560 | 6/1967 | Trbovich | 277—205 X |

FOREIGN PATENTS

| | | |
|---|---|---|
| 1,286,520 | 1/1962 | France. |
| 451,812 | 8/1936 | Great Britain. |

LAVERNE D. GEIGER, Primary Examiner

J. S. MEDNICK, Assistant Examiner

U.S. Cl. X.R.

277—143, 149, 205